United States Patent [19]

Baert

[11] Patent Number: 5,171,338
[45] Date of Patent: Dec. 15, 1992

[54] GAS FILTER INSTALLATION WITH IMPROVED UNCLOGGING MEANS

[75] Inventor: Jacques Baert, Combs LaVille, France

[73] Assignee: W. L. Gore & Associates, Inc., Newark, Del.

[21] Appl. No.: 726,453

[22] Filed: Jul. 8, 1991

[30] Foreign Application Priority Data

Jul. 9, 1990 [FR] France ............................ 90 08680

[51] Int. Cl.5 .......................................... B01D 46/04
[52] U.S. Cl. .................................... 55/302; 55/341.1; 55/528
[58] Field of Search ................. 55/96, 302, 341.1, 528

[56] References Cited

U.S. PATENT DOCUMENTS 3,146,080  8/1964  Ruble et al. ............................ 55/302
3,951,623  4/1976  Furstenberg ............................ 55/96
4,681,604  7/1987  Niederer ................................. 55/96
5,064,454 11/1991  Pittman .................................. 55/302

FOREIGN PATENT DOCUMENTS 700483  12/1964  Canada .................................. 55/302
0244938 11/1987  European Pat. Off. .
897044  11/1953  Fed. Rep. of Germany .
925392  3/1955   Fed. Rep. of Germany .
6253720 3/1987   Japan ................................. 55/341.1

Primary Examiner—Bernard Nozick
Attorney, Agent, or Firm—Gary A. Samuels

[57] ABSTRACT

An installation for filtering air comprises a plurality of cells in parallel and each including an inlet, at least one filter, and an outlet, the inlets being connected to an inlet manifold, and means being provided for causing the gas to flow through said cells. The installation further comprises: a first shutter in each inlet; and dust-removal manifold connected to the bottom of each cell via a dust-removal passage in which a second shutter is provided; and means for establishing a backflow of gas through each cell. For filtering, the first shutter is open and the second shutter is closed. For unclogging the first shutter is closed and the second shutter is open, and the backflow means unclog particles and remove them.

2 Claims, 3 Drawing Sheets

GAS FILTER INSTALLATION WITH IMPROVED UNCLOGGING MEANS

The present invention relates in general to gas filter installations, in particular for filtering air.

BACKGROUND OF THE INVENTION

A filter installation of conventional design in the art comprises an air inlet manifold, a battery of filter cells in parallel, each comprising one or more filter socks or the like, and a filtered air take-up manifold. For a suction type apparatus, air flow is achieved by a suction fan provided in the take-up manifold.

In this kind of apparatus, as the filters clog up, the filter capacity of the apparatus in terms of volume filtered per unit time is greatly reduced, and the apparatus must be unclogged from time to time.

To this end, it is conventional to provide controlled shutter means in each cell downstream from its filter sock, thereby enabling the outlet from the cell to be connected selectively either to the take-up manifold or else to ambient air at atmospheric pressure.

In filter mode, the cell is connected to the take-up manifold with the fan causing air to flow through the cell. In unclogging mode, the top portion of the cell under consideration is connected to ambient air, and since the pressure at the bottom of this cell is lower than atmospheric pressure (the filter system being a suction system) a backflow of air is established through the filter sock which is thus cleared off the particles that were previously adhering thereto. These particles then fall into the inlet manifold which has a conveyor device at the bottom thereof such as an Archimedes screw or the like for removing them.

Such a solution nevertheless suffers from drawbacks. Firstly when the particles coming off the filter during unclogging fall downwards, a substantial fraction thereof enter the inlet manifold to be refiltered by adjacent cells. Thus, in practice, these particles are not found in the dust-removal device but are to be found once again on filter membranes in adjacent cells which therefore clog up that much more quickly.

Secondly, it can happen in practice that the backflow velocity is too low to provide complete unclogging of the filter sock.

Batteries of filters are also known, in particular as described in German patent No. 897 044 and U.S. Pat. No. 3,951,623 in which backflow can be established individually in each filter for unclogging purposes by opening a valve provided between the inlet for air to be filtered and an auxiliary fan associated with a separator. The major drawback of such systems lies in that a large fraction of the air flowing to the auxiliary fan may come from the inlet for air to be filtered such that the flow rate of the backflow air passing through the filters is necessary limited and unclogging takes a long time or is incomplete.

German patent no. 925 392 describes a battery of filters in which the unclogging backflow is achieved by isolating the upstream end of each filter from the air inlet. However, in that device, as in the device described in above-mentioned German patent No. 897 044, the air leaving the auxiliary fan and the separator reenters the inlet for air to be filtered while it is still charged with fine particles. Thus, while the filter is being cleaned, a phenomenon occurs whereby the rate at which the other filters become clogged up is accelerated, as in the first-mentioned prior art.

The present invention seeks to mitigate the drawbacks of the prior art and, in a filter system of the type mentioned in the introduction, to provide much more effective means for unclogging each individual filter cell while also ensuring that no extra dust is added to the air being filtered by the adjacent cells.

Another object of this invention is to provide a filter system wherein means for generating the unclogging backflow, together with its auxiliary filter, can have reduced dimensions and power while still having a very effective unclogging action.

SUMMARY OF THE INVENTION

Thus, the present invention provides an installation for filtering air or another gas, the installation being of the type comprising a plurality of filter cells disposed in parallel and each including an inlet passage for gas to be filtered, at least one filter, and an outlet passage for filtered gas, the inlet passages of said cells being connected to an inlet manifold, and means being provided for causing gas to be filtered to flow through said cells, the installation further comprising:
 first shutter means provided in each inlet passage;
 a dust-removal manifold connected to the bottom region of each cell via a dust-removal passage in which second shutter means are provided;
 means for establishing a backflow of gas through each cell, said means being associated with auxiliary filter means opening out to ambient air; and
 each cell being suitable for operating in a filter mode in which its first shutter means is open and its second shutter means is closed, and in an unclogging mode in which its first shutter means is closed and its second shutter means is open and in which the backflow means are put into operation to unclog particles that have accumulated on the filter and remove them via the dust-removal manifold.

BRIEF DESCRIPTION OF THE DRAWINGS

Embodiments of the invention are described by way of example with reference to the accompanying drawings, in which.

As a preliminary point, it should be observed that items or portions that are identical or similar from one figure to another are designated by the same reference symbols.

DETAILED DESCRIPTION

Figure 1:
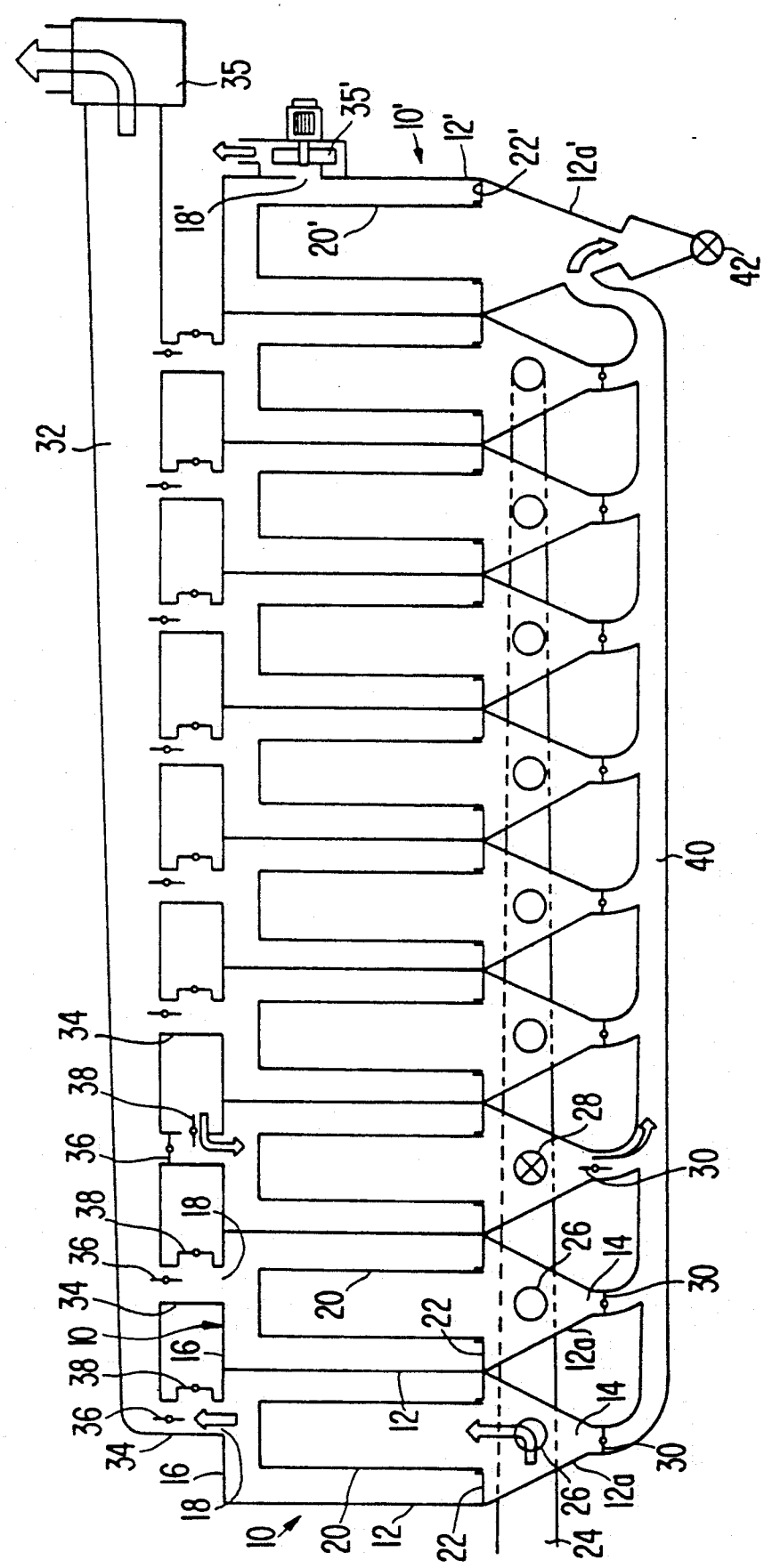
FIG. 1 is a diagrammatic vertical section through a first embodiment of a filter unit of the invention.

With reference initially to FIG. 1, a filter installation is shown comprising a plurality of filter cells that are adjacent to one another. Each cell 10 comprises an enclosure 12 which is generally cylindrical in shape, for example, having a bottom portion 12a that tapers, e.g. conically, down to a bottom dust-removal opening 14. The top of the enclosure 12 is closed by a horizontal wall 16 through which an opening 18 is provided to constitute an outlet for filtered air.

A filter sock 20 is provided inside the enclosure 12 together with means 22 shown diagrammatically and only in part for the purpose of supporting the sock and keeping it in shape. In a manner which is particularly advantageous but not essential, each sock is made of a filter medium including an expanded polytetrafluoroethylene membrane, thereby optimizing the performance of the installation.

An inlet manifold 24 for air to be filtered is constituted by a duct whose cross-section tapers progressively from the first cell (to the left) to the last cell. The manifold 24 opens out into the bottom portion 12a of each enclosure via a passage 26 capable of being selectively closed by a shutter 28. In the third cell from the left, the cross in the opening 26 associated with the shutter 28 symbolizes a shutter that is in its closed position. In each of the other cells 10, the shutter is shown as being open and is not drawn individually in order to simplify the drawing.

A second shutter 30 is provided in the dust-removal opening 14 from each cell for the purpose of selectively opening or closing passage therethrough.

An air take-up manifold 32 is provided in the form of a duct whose cross-section flares progressively from the first cell to the last cell and it is connected to each of the outlet openings 18 via a respective vertical passage 34.

The outlet from the manifold 32 is connected to a suction fan shown diagrammatically at 35.

Each of the vertical passages 34 is provided firstly with a shutter member 36 for closing the passage and secondly, beneath said shutter, with a shutter 38 for connection to ambient air thereby making it possible to put the inside of the passage into communication with the surrounding environment (air at atmospheric pressure).

The dust-removal openings 14 from the cells are connected via the shutters 30 to a dust-removal manifold 40 which opens out into the bottom portion of an auxiliary filter cell 10'. In practice, this auxiliary cell may be conventional in design and it is dimensioned as a function of the characteristics of an unclogging air flow rate (described below) and as a function of the quantity and type of dust to be collected. In the present case, this cell comprises an enclosure 12', a filter sock 20' associated with support and holding means 22', a fan 35' mounted in an outlet passage 18', and at the bottom of the enclosure, means represented diagrammatically at 42 for extracting the solids which are deposited therein. These means may be constituted by an Archimedes screw or the like, for example. Means, not shown, are also provided for unclogging the filter in the auxiliary cell.

Each filter cell in the installation has two different operating modes: in filter mode, shutters 28 and 36 are open while shutters 30 and 38 are closed. The cell is thus connected to the inlet manifold 24 and to the take-up manifold 32 while being isolated both from the outside air and from the dust-removal manifold 40. The flow of gas to be filtered thus travels upwards under suction from the fan 25 and passes through the sock 20 for filter purposes with particles being retained by the sock.

When a cell is being operated in unclogging mode, the state of each of its four shutters is reversed. As a result the cell is isolated from the inlet and take-up manifolds, but a backflow of air is established via the shutter 38 for connection to ambient air, the filter sock 20, the dust-removal passage 14, and the dust-removal manifold 40 which is subjected to suction from the fan 35'. The effect of this backflow is to remove the particles that have previously accumulated on the filter membrane. These particles fall to the bottom of the portion 12a of the enclosure and are entrained by the air into the manifold 40 until they reach the auxiliary cell 10'. Therein, depending on the size and the density of the particles, they either fall directly towards the dust-removal means 42, or else they are intercepted by the filter 20'.

It may be necessary to unclog the filter 20' from time to time. To do this, all of the shutters 30 are closed and unclogging means for the filter 20' are put into operation (e.g. means of the type using a reverse jet of forced air, or the like).

In FIG. 1, the third cell from the left is shown as being in the unclogging situation, whereas the other cells 10 are operating in filter mode.

The various shutters may be provided with automatic control, for example, thereby ensuring that each of the cells 10 is unclogged cyclically, and also causing the auxiliary cell to be unclogged from time to time.

It will be understood that because of the present invention each cell can be unclogged without having any influence on the filtering taking place in the adjacent cells. In particular, particles that are removed from the filter that is being unclogged are prevented from adding dust to the gas which is to be filtered by adjacent cells. Further, given that the components that participate in the unclogging can be designed without particular limitations concerning filtering, it is possible to move towards extremely short unclogging times, thereby keeping the overall capacity of the filter installation at a high level.

Figure 2:
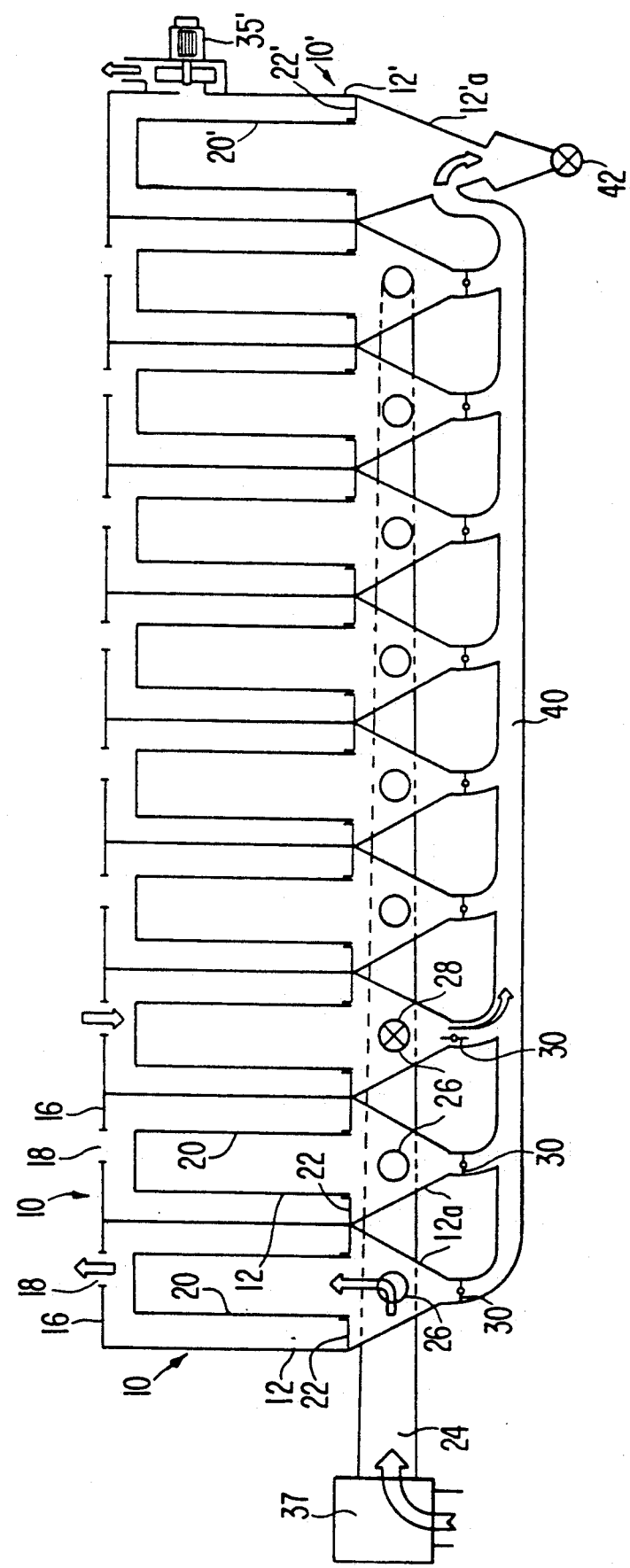
FIG. 2 is a diagrammatic vertical section through a second embodiment of the invention.

FIG. 2 shows a second embodiment of the invention. The essential difference compared with the installation of FIG. 1 lies in the fact that the gas to be filtered is caused to flow through the filter by a blower, diagrammatically represented at 37, with the inlet manifold being connected to the outlet from the blower.

As a corollary, the take-up manifold 32 provided in FIG. 1 can be omitted and the tops of the enclosures 12 open out directly to ambient air via the openings 18. The shutters 36 and 38 of each of the cells may also be omitted.

In filter mode, shutter 28 of the cell in question is open while its shutter 30 is closed.

In unclogging mode, the positions of these two shutters are interchanged, so that a backflow is established by the suction fan 35' in the auxiliary cell via the dust-removal manifold 40 and the open shutter 30, with air being capable of entering freely via the top opening 18;

Similarly, said auxiliary cell can be unclogged by closing all of the shutters 30.

Figure 3:
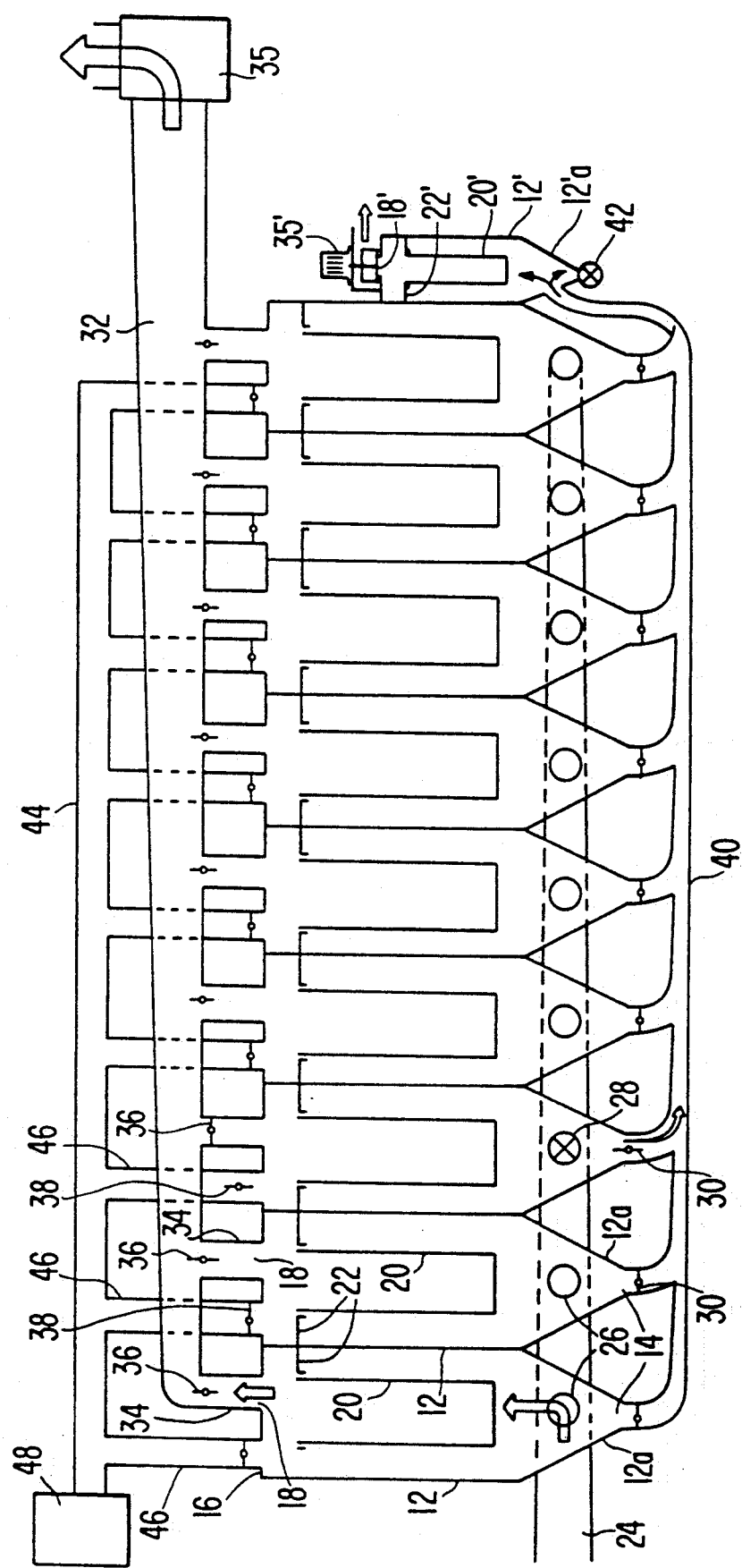
FIG. 3 is a diagrammatic vertical section through a third embodiment of the invention.

A third embodiment is shown in FIG. 3. The gas to be filtered is driven in this case by suction, as in FIG. 1, and the associated components are given the same reference numerals.

However, in this embodiment, the unclogging of the individual cells is assisted by a pulsed air flow. More precisely, each shutter 38 which was provided for connection to ambient air in FIG. 1 is now connected to a pulsed air feed duct 46 which is connected to a pulsed air feed manifold 44, which is in turn connected to a pulsed air generator, represented diagrammatically at 48, which generator may be of any suitable type.

It may also be observed that the filter socks 20 and 20' are disposed the other way up (they may be disposed either way in any of the embodiments).

A cell operates in filter mode if its shutters 28 and 36 are open and its shutters 30 and 38 are closed. By swapping over the positions of the shutters, a cell is unclogged in the following manner: the unclogging of the filter is effected solely or mainly by the air pulses applied thereto. And since the duct 40 and the auxiliary fan 35' are no longer required for passing through the filter an intense unclogging air flow (as it is the case in FIG. 1), but are provided merely for pneumatically transporting the particles that have been already separated from the filter by the air pulses, the size of the duct 40, the fan 35' and the auxiliary filter 20' can be substantially reduced without any drawback.

It is clear that the pulsed air unclogging system as described above can be applied equally well to a suction filter installation (as shown in FIG. 1) or to a blow filter installation (as shown in FIG. 2).

In a blow installation, the take-up manifold may be omitted, but the shutters 36 and 38 are nevertheless provided for selectively allowing filtered gas to escape (filter mode) or pulsed air to be injected (unclogging mode).

Naturally, the present invention is not limited in any way to the embodiments described above and shown in the drawings, and the person skilled in the art will be able to make numerous variations and modifications thereon within the scope of the invention.

I claim:

1. An apparatus for filtering gas, comprising:

a plurality of filter cells arranged in parallel, each cell having at least one filter sock extending substantially vertically, open at a top end and closed at a bottom end; plate means for separating each cell into a top compartment and a bottom compartment and for supporting said at least one filter sock in the region of its top open end; an inlet passage for gas to be filtered, opening into said top compartment; a dust-removal passage opening into said bottom compartment; and a pulsed-gas inlet for unclogging said at least one filter sock, opening into said top compartment;

first, second, third and fourth shutter means provided in said inlet passage, said dust-removal passage, said outlet passage and said pulsed-gas inet, respectively;

an inlet manifold to which said inlet passages are connected;

means for causing said gas to be filtered to flow through said inlet manifold and said filter cells;

a pulsed-gas inlet manifold to which said pulsed-gas inlets are connected;

a dust-removal manifold to which said dust-removal passages are connected;

an auxiliary filter means connected to said dust-removal manifold;

pulsed-gas generator means for causing a backflow of pulsed gas to flow through the pulsed-gas inlet manifold, the cells, the dust-removal manifold and the auxiliary filter means for selectively unclogging said at least one filter sock in each cells;

each cell being capable of operating in a filtering mode wherein its first and third shutter means are open and its second and fourth shutter means are closed, and capable of operating in an unclogging mode wherein its first and third shutter means are closed and its second and fourth shutter means are open.

2. An apparatus according to claim 1, wherein the filter sock is made of an expanded porous polytetrafluoroethylene.

* * * * *